(12) United States Patent
Bailey

(10) Patent No.: US 12,085,136 B2
(45) Date of Patent: Sep. 10, 2024

(54) VIBRATIONAL DECOUPLING INTERFACE

(71) Applicant: Deon Bailey, Bella Vista (AU)

(72) Inventor: Deon Bailey, Bella Vista (AU)

(73) Assignee: Deon Bailey, Bella Vista (AU)

( * ) Notice: Subject to any disclaimer, the term of this patent is extended or adjusted under 35 U.S.C. 154(b) by 226 days.

(21) Appl. No.: 17/603,095

(22) PCT Filed: Apr. 9, 2020

(86) PCT No.: PCT/AU2020/050358
§ 371 (c)(1),
(2) Date: Oct. 12, 2021

(87) PCT Pub. No.: WO2020/206502
PCT Pub. Date: Oct. 15, 2020

(65) Prior Publication Data
US 2022/0178420 A1 Jun. 9, 2022

(30) Foreign Application Priority Data

Apr. 12, 2019 (AU) .................... 2019901264

(51) Int. Cl.
| F16F 15/03 | (2006.01) |
| F16F 6/00 | (2006.01) |
| F16F 15/02 | (2006.01) |
| A01D 34/82 | (2006.01) |
| A01D 34/90 | (2006.01) |

(52) U.S. Cl.
CPC .............. *F16F 15/03* (2013.01); *F16F 6/005* (2013.01); *F16F 15/022* (2013.01); *A01D 34/824* (2013.01); *A01D 34/905* (2013.01); *F16F 2222/06* (2013.01)

(58) Field of Classification Search
CPC .................................. F16F 15/03; H02K 7/09
See application file for complete search history.

(56) References Cited

U.S. PATENT DOCUMENTS

| 4,926,947 A | 5/1990 | Cozine et al. |
| 7,228,930 B1 * | 6/2007 | Vey ........................ B62K 13/04 |
| | | 180/209 |

FOREIGN PATENT DOCUMENTS

| CN | 1127334 A | * | 7/1996 |
| CN | 2809329 Y | | 8/2006 |
| CN | 102359526 A | * | 2/2012 |
| CN | 108502673 A | * | 9/2018 |
| CN | 110005737 A | * | 7/2019 |
| EP | 1754910 A1 | * | 2/2007 ................ F16F 9/48 |
| EP | 1613143 B1 | | 9/2010 |

* cited by examiner

*Primary Examiner* — Melanie Torres Williams
(74) *Attorney, Agent, or Firm* — POLSINELLI PC

(57) ABSTRACT

A vibrational decoupling interface connects between handle shafts of power tools such as lawnmowers, line trimmers and the like. The interface has a housing coupled to one of the shafts and having a channel having a first magnet at a first end thereof and a second magnet at a second end thereof. The channel further has a travelling magnet travelling between the first and second magnets, the magnets arranged such that the travelling magnet is repelled from the first and second magnets and the travelling magnet is coupled to the other shaft to thereby reduce the transmission of vibration between the shafts.

12 Claims, 3 Drawing Sheets

VIBRATIONAL DECOUPLING INTERFACE

CROSS REFERENCE TO RELATED APPLICATIONS

This application is a National Phase filing under 35 U.S.C. § 371 of PCT/AU2020/050358 filed on Apr. 9, 2020; which application in turn claims priority to Application No. 2019901264 filed in Australia on Apr. 12, 2019. The entire contents of each application are hereby incorporated by reference.

FIELD OF THE INVENTION

This invention relates generally to vibrational decoupling interface for power tool such as lawnmowers, line trimmers and the like.

BACKGROUND OF THE INVENTION

Vibrations from power tool such as lawnmowers, line trimmers and the like may induce carpal tunnel syndrome in operators thereof and, as such, various vibrational decoupling arrangements exist including EP 1613143 B1 (VICTA LAWNCARE PTY. LTD.) 8 Sep. 2010 [hereinafter referred to as D1] which discloses an assembly to reduce the transmission of vibration to the operator or lawnmower. The apparatus of D1 comprises side assemblies acting between short and long handle rails of the lawnmower which comprises tension springs acting in opposition.

U.S. Pat. No. 4,926,947 A (COZINE et al.) 22 May 1990 [hereinafter referred to as D2] discloses, with reference to FIGS. 7-9 thereof, horizontally disposed bolt which allows the handle element to pivot about the bolt in a vertical plane to absorb most of the vertical vibration forces induced by the vertically reciprocating tine arms.

U.S. Pat. No. 4,819,742 A (DRIGGERS) 11 Apr. 1989 [hereinafter referred to as D3] discloses an alternative arrangement for a line trimmer which has an axially tapered body which coaxially circumscribes a driveshaft and which is sufficiently wide such that the driveshaft can oscillate and pivot within the tapered body. A handle grip is attached to the body such that vibration is not transmitted thereto from the driveshaft.

CN 204090540 U (TIANJIN HUIZHOU TECHNOLOGY DEVELOPMENT CO., LTD) 14 Jan. 2015 [hereinafter referred to as D4] discloses an antivibration handrail having telescopic rods having arrangements of cushion pads, springs and repelling magnets located therebetween.

The present invention seeks to provide a vibrational decoupling interface, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a vibrational decoupling interface which connects between handle shafts to decouple vibrations therebetween. The interface comprises a housing defining a channel therealong, the housing coupled to one of the shafts. The channel comprises a first magnet at a first end of the channel and a second magnet at a second end of the channel. The channel further comprises a travelling magnet between the first and second magnets.

The magnets are arranged such that the travelling magnet repels the first and second magnets and the travelling magnet is coupled to the other shaft. Adjacent faces of the first and second magnets may be of the same polarity as that of respective adjacent faces of the travelling magnet. Furthermore, travelling magnet may comprise a back-to-back pair of magnets with a magnetic shield therebetween.

The first and second magnets may be spaced to provide a minimum repulsive force on the travelling magnet to bias the travelling magnet towards a centrepoint therebetween to reduce or eliminate hysteresis.

The channel may be orientated longitudinally with respect to the shafts such that the interface may be applied to a lawnmower as shown in FIG. 1. As such, the interface may provide magnetic vibrational decoupling both when pushing and pulling the lawnmower. Furthermore, in this embodiment, the shafts may be pivotally coupled by the interface to provide vibrational decoupling for vibrational forces acting orthogonally with respect to the longitudinal axes of the shafts.

The other shaft bypasses one of the first and second magnets to reach the travelling magnet between the first and second magnets such as by engaging through a side of the channel as shown in FIG. 3 or 6 or engaging via a shaft to one of the first and second magnets are shown in FIG. 5.

Biasing mechanisms including compression springs may assist the magnets for end of range vibrational decoupling. In one embodiment, the first magnet also travels along the channel and wherein a compression spring pushes against the first magnet in opposition to the travelling magnet such that compressive force applied by the compression spring and magnetic force applied by the first magnet act simultaneously on the first magnet.

Alternatively, the channel may be orientated orthogonally with respect to the shaft such that the interface may be applied to a line trimmer shown in FIG. 2. As such, the interface may provide magnetic vibrational decoupling both when holding the line trimmer up and when pressing down on the cutting head.

In this embodiment, the interface may comprise first and second ends of each of which define respective apertures for engaging respective shafts orthogonally therethrough and which move relative to each other to provide vibrational decoupling therebetween. The second end may define a pair of channels having respective first and second magnets therein and the first end may comprise a stem having lateral connections which extend laterally into the adjacent channels to hold respective travelling magnets therein.

Unlike the springs of the side assemblies of D1 which act under tension the present interface acts under compression and moreover, under magnetic repulsive force which increases non-linearly with distance, thereby providing enhanced vibrational decoupling as compared to linear spring force. The magnetic decoupling of D4 does not provide bidirectional decoupling as does the present interface and the principle of operation of D4 of using repulsive magnetic force is incompatible in combination with D1 which utilises opposing spring tensile force. Furthermore, the telescopic configuration taught by D4 makes it difficult to incorporate the second repulsive magnet of the present interface therein. Furthermore, the telescopic configuration taught by D4 renders it difficult to pivotally couple the shafts together.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
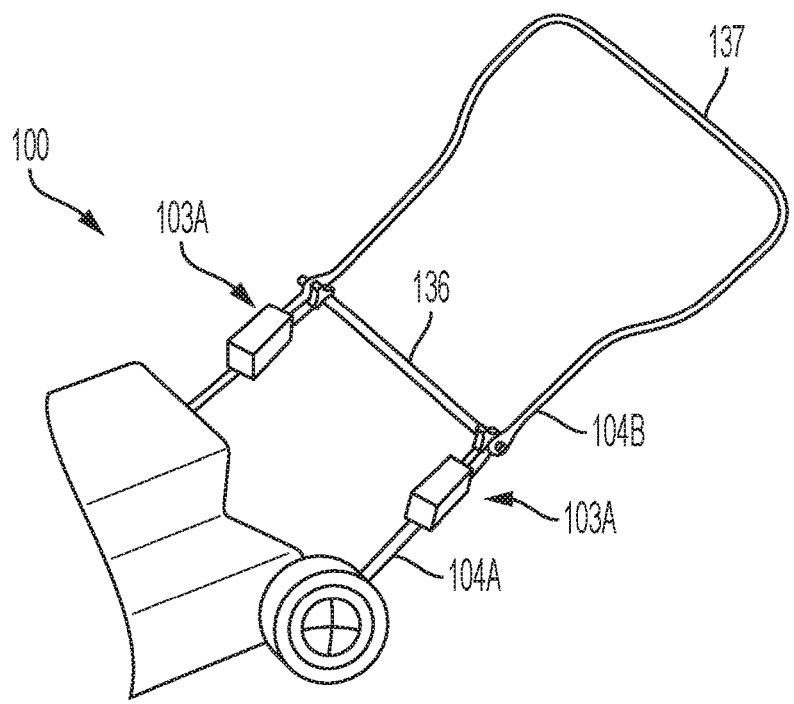
FIG. 1 shows vibrational decoupling interfaces applied to a lawnmower in accordance with an embodiment.

A vibrational decoupling interface 103A according to a first embodiment has application for a lawnmower 100 and similar power tools as shown in FIG. 1.

The lawnmower 100 may be of conventional configuration in comprising a short handle rail 136 and a long handle rail 137. The long handle rail 137 is typically pivotally coupled from the short handle rail 136 for assisting in the stowage thereof.

The vibrational decoupling interface 103 interfaces between a handle shaft 104A of the short handle rail 136 and a handle shaft 10413 of the long handle rail 137. As can be seen, a pair of interfaces 103A may be applied to respective shafts 104 of the short and long handle rails 136, 137.

The interface 103A acts along longitudinal axis of the shafts 104 to decouple vibrations from travelling longitudinally between the shafts 104.

In embodiments, the decoupling interface 103 may be fastened to an existing lawnmower wherein the long handle rail 137 is detached from the pivot points of the short handle rail 136 and instead pivotally coupled to the vibrational decoupling interface 103A which is secured along the short handle rail 136. As such, the lawnmower 100 may be used in the conventional manner, including allowing the pivoting of the handle rail 136 with respect to the short handle rail 136 whilst decoupling vibrations from the long handle rail 137.

Figure 2:
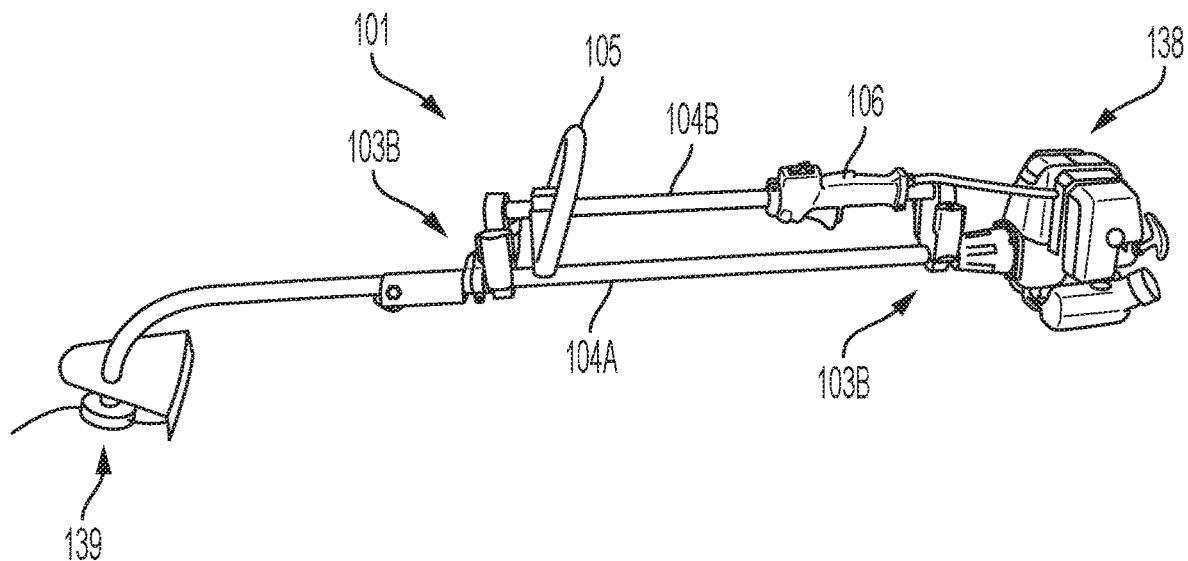
FIG. 2 shows vibrational decoupling interfaces applied to a line trimmer in accordance with a further embodiment.

The vibrational decoupling interface 10313 in accordance with a second embodiment has application for a line trimmer 101 and similar power tools shown in FIG. 2. The line trimmer 101 comprises a motor 138 turning a cutting head 139 at a distal end of a driveshaft 104A.

A handle shaft 10413 may be coupled adjacently parallel to the driveshaft 104A by a pair of vibrational decoupling devices 10313 at opposite ends thereof. The handle shaft 10413 may comprise a handle grip 105 and a trigger mechanism 104 for holding and controlling the line trimmer 101.

In this embodiment, the vibrational decoupling device 10313 acts substantially orthogonally with respect to the longitudinal axis of the driveshaft 104A.

Figure 3:
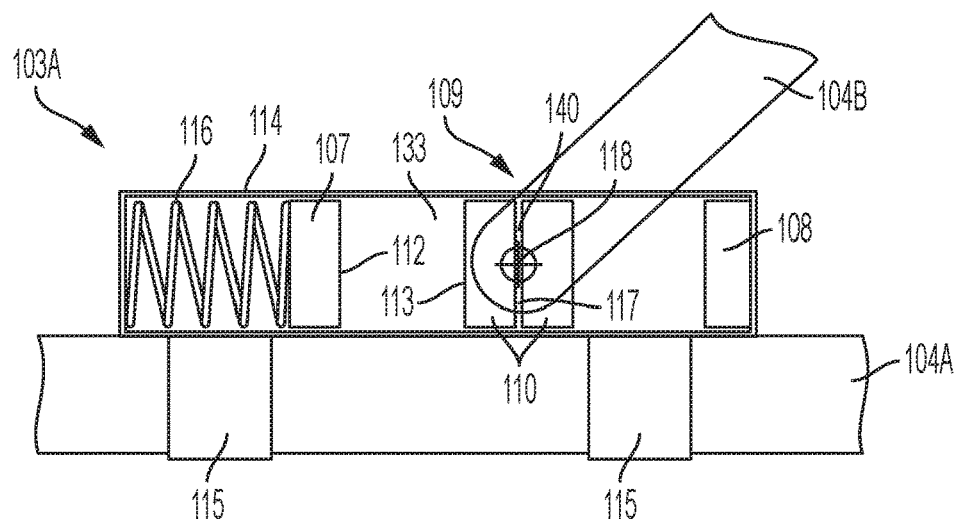
FIG. 3 shows a cross-sectional view of a vibrational decoupling interface in accordance with an embodiment.

FIG. 3 shows a cross-sectional view of the vibrational decoupling device 103A in accordance with a first embodiment.

The interface 103A may comprise a longitudinal housing 114 defining a longitudinal channel 113 therein. The housing 114 may be rectangular or circular in longitudinal cross-section.

The housing 114 is connected to one of the handle shaft 104 by connectors 115 such as handle shaft 104A or 1046.

The housing 114 comprises a first magnet 107 at a first end of the channel 133 and a second magnet 108 and a second end of the channel 133.

The interface 103A further comprises a travelling magnet 109 between the first magnet 107 and the second magnet 108.

The magnets 107, 108, 109 are arranged such that the travelling magnet 109 is repelled by both the first magnet 107 and the second magnet 108 so as to tend towards a midpoint thereof. The magnets 107, 108, 109 may comprise strong rare earth magnets.

Faces 112 of the first and second magnets 107, 108 may be of the same polarity as that of a respective adjacent face 113 of the travelling magnet 109.

In this regard, the travelling magnet 109 may comprise a back-to-back pair of oppositely orientated magnets 110. The magnets 110 may comprise a magnetic field 140 therebetween, such as a dielectric insulator.

As such, and with further reference to FIG. 1, when pushing the lawnmower 100 forwards by the long handle rail 137, the travelling magnet 109 is repelled from the first magnet 107, thereby decoupling vibrations of the short handle rail 136 from the long handle rail 137.

Furthermore, when pulling the lawnmower 100 in reverse by the long handle rail 137, the travelling magnet 107 is repelled by the second magnet 108, thereby also decoupling vibrations from the short handle rail 136 from the long handle rail 137.

Figure 4:
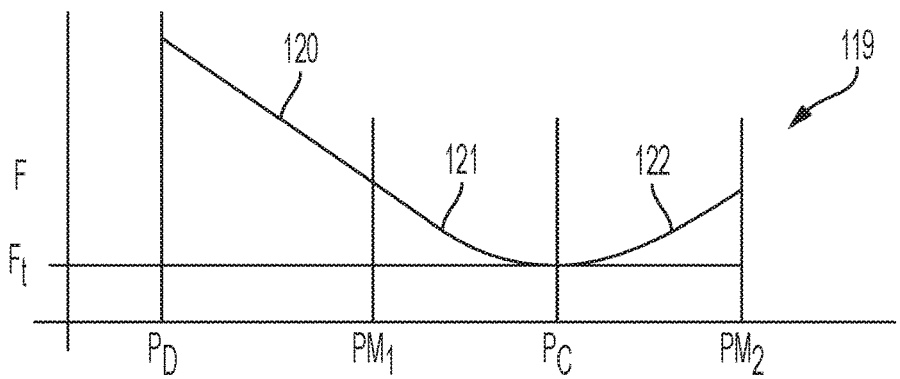
FIG. 4 shows applied forces of the interface of FIG. 3.

With reference to the applied forces 119 of FIG. 4, first magnetic force 121 may act between the first magnet 107 and the travelling magnet 109 between a centrepoint position $P_C$ and a position $P_{M1}$ at which the travelling magnet 109 is adjacent the first magnet 107. The magnetic force 121 increases nonlinearly towards position $P_{M1}$.

Second magnetic force 122 may act between the travelling magnet 109 and the second magnet 108 between the centrepoint position $P_C$ and a position $P_{M2}$ at which the travelling magnet 109 is adjacent the second magnet 108.

In the embodiment shown, the magnitude of forces 121 and 122 is substantially the same at positions $P_{M1}$ and $P_{M2}$ respectively. However, in embodiments, magnets 107, 108, 109 may be configured such that the first magnetic force 121 is greater magnitude than that of the second magnetic force to, for example, allow for greater repulsive force for pushing the lawnmower 100 as opposed to pulling the lawnmower.

In embodiments, the interface 103A comprises an assisting biasing mechanism which, in the embodiment shown in FIG. 3 takes the form of a coiled compression spring 116.

In accordance with this embodiment, the first magnet 107 also travels along the channel 133 and compresses against the compression spring 116. The travelling of the first magnet 107 allows the magnetic force thereof and the force of the compression spring 116 to apply simultaneously on the travelling magnet 109.

In the embodiment shown, the compression spring 116 is within the channel 133 and is located between a face of a distal end of the housing 114 and an adjacent face of the first magnet 107. However, in alternative embodiments the compression spring 116 may be located adjacent the channel 133 by connections flanges extending therefrom.

As such, with further reference to FIG. 4, the applied forces may further comprise a biasing force 120 between position $P_{M1}$ and distal position $P_D$ where the biasing mechanism is nearly fully compressed.

As can be seen, the biasing force 120 increases the force of the first magnetic force 121 to thereby provide end of range vibrational decoupling.

In the embodiment shown, the compression spring 116 is located to provide assistive end of range vibrational decoupling when pushing the lawnmower 100. In additional or alternative embodiments, a compression spring 116 may act between the travelling magnet 109 and the second magnet 108 to furthermore provide assistive end of range vibrational decoupling when pulling the lawnmower 100.

With reference to FIG. 4, the first and second magnets 107, 108 may be spaced apart such that a minimum force $F_t$ is applied at the centrepoint position $P_C$, thereby biasing the travelling magnet 109 at the centrepoint position $P_C$ and reducing or eliminating hysteresis.

Furthermore, the long handle rail 137 may yet be pivotally coupled to the interface 103A thereby decoupling vibrations acting orthogonally with respect to the elongate axes of the shafts 104.

Specifically, the embodiment shown in FIG. 3 shows the shaft 1046 pivotally coupled to the travelling magnet 109 at a pivot point 118. In this embodiment, the distal end of the shaft 104*b* intersects the channel 133, either by inserting into the channel 133 and engaging the travelling magnet 109 therein or alternatively locating to one side of the housing 114 and being operably coupled to the travelling magnet 109 by lateral extending connections flange. As such, the shaft 10413 bypasses the second magnet 108 to reach the travelling magnet 109 between the first and second magnets 107, 108.

Figure 5:
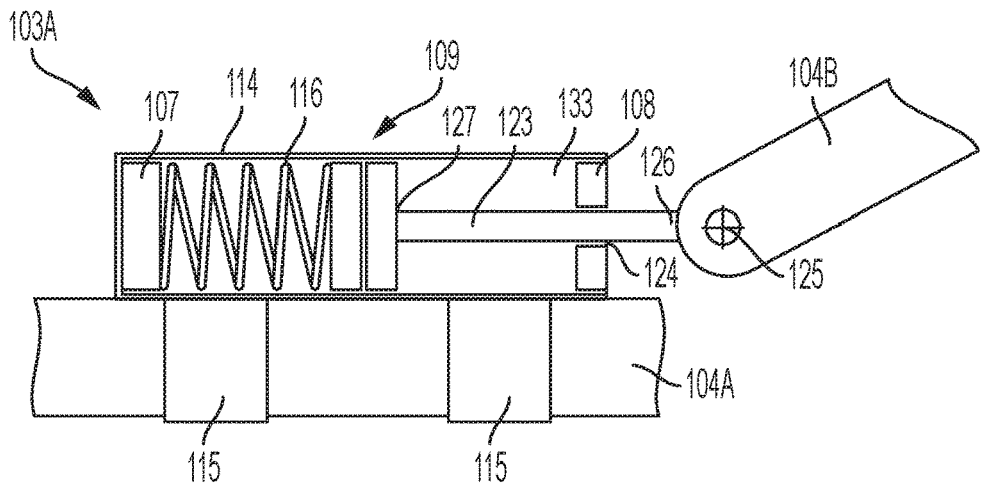
FIG. 5 shows a cross-sectional view of a vibrational decoupling interface in accordance with a further embodiment.

In a further embodiment shown in FIG. 5, the shaft 10413 is yet pivotally coupled to the vibrational decoupling interface 103A. However, in this embodiment, the interface 103A comprises an aligned extension shaft 123 running along the channel 133 towards the shaft 10413. The aligned extension shaft 123 is coupled to the travelling magnet 109 at a proximal end 127 thereof and pivotally coupled at a point 125 to the shaft 10413 at a distal end 126 thereof. As such, the shaft 10413 similarly bypasses the second magnet 108 to reach the travelling magnet 109 between the first and second magnets 107, 108.

The aligned extension shaft 123 may be orientated longitudinally along the channel 133.

Furthermore, the shaft 123 is retained through an aperture 124 through a collar or through the second magnet 108 such that the aperture 124 and the proximal end 127 hold the shaft 123 in alignment.

Further in accordance with the embodiment shown in FIG. 5, the biasing mechanism may act between the travelling magnet 109 and the first magnet 107 wherein the first magnet 107 is fixed at an end of the housing 114. In the embodiment shown, the biasing mechanism may comprise a coiled compression spring 116 acting between adjacent faces of the first magnet 107 and the travelling magnet 109. The compression spring 116 may locate within the channel 133 or adjacent the housing 114 on one or both sides thereof and connected by lateral extending connections flanges (not shown).

Figure 6:
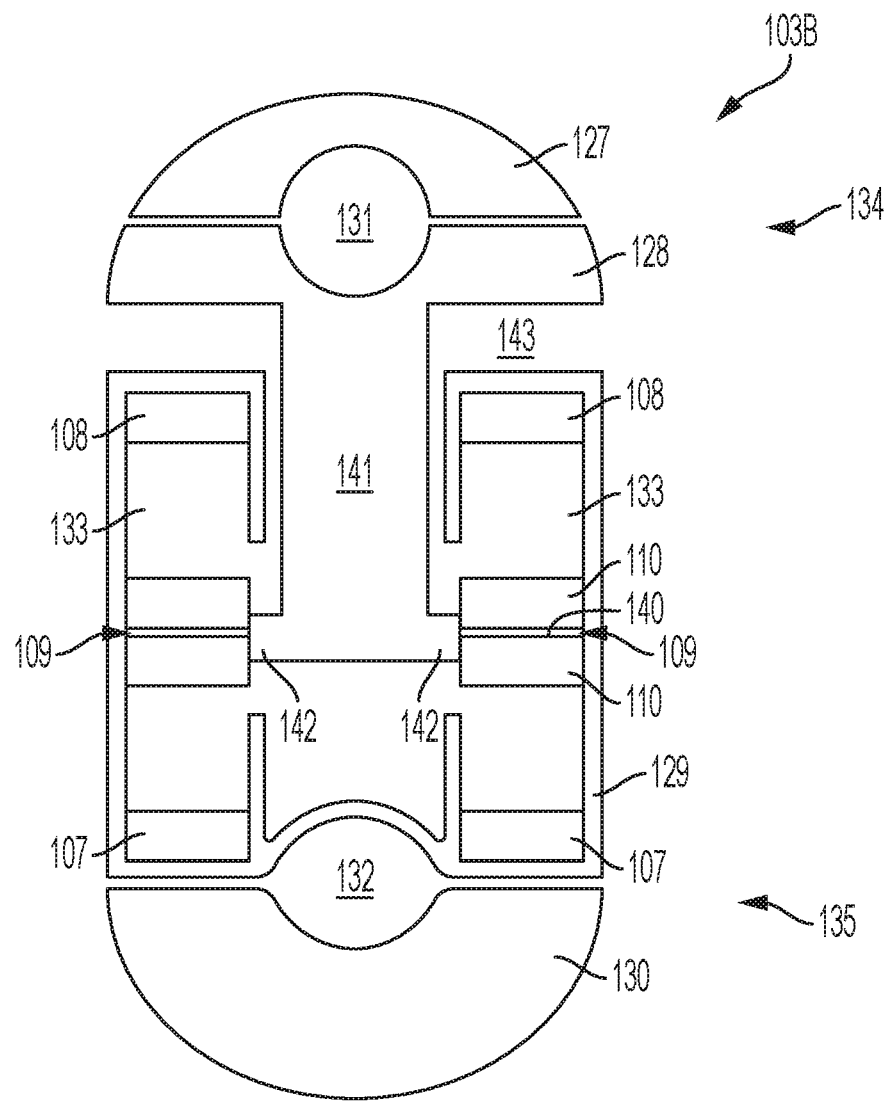
FIG. 6 shows a cross-sectional view of a vibrational decoupling interface in accordance with a yet further embodiment.

FIG. 6 shows the vibrational decoupling interface 10313 in accordance with the second embodiment.

In accordance with this embodiment, the interface 10313 may comprise a first end 134 movably coupled to a second end 135.

The first end 134 may comprise a first piece 127 which clamps to a second piece 128 and which may define an aperture 131 therebetween for orthogonally engaging one of the shaft 104 therethrough.

Similarly, the second end 135 may comprise a first piece 129 clamped to a second piece 130 which defines a further aperture 133 for orthogonally engaging the other shaft 104 therethrough.

As such, when the shafts 104 are engaged through the respective apertures 131, 132, the first and second ends 134, 135 move with respect to each other to decouple vibrations from the drive shaft 104A to the handle shaft 10413.

The first piece 129 of the second-hand 135 may define a pair of channels 133 each of which comprises the first magnet 107 fixed at a distal end thereof and the second magnet 108 fixed at a proximal end thereof. The second piece 128 of the first end 134 may comprise a stem 141 that inserts between the channels 133 and comprises lateral connections 142 which connect respective travelling magnets 109 within each channel 133. As such, the shaft in aperture 131 bypasses the second magnet 108 via the stem 141 to reach the travelling magnet 109 between the first and second magnets 107, 108.

The second piece 128 of the first end 134 and the first piece 129 of the second end may allow a suitable gap 143 therebetween greater than the magnitude of vibrations along the shaft 10413. The channels 133 may comprise similarly sized adjacent openings to accommodate the lateral connections 142 therethrough.

In embodiments, the interface 10313 may similarly comprise the biasing mechanisms assisting the magnets as described above with reference to FIGS. 3-5.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A vibrational decoupling interface connecting between first and second handle shafts, the interface comprising a housing coupled to the first shaft, the housing defining a channel, the channel comprising a first magnet at a first end thereof and a second magnet at a second end thereof, the channel further comprising a travelling magnet coupled to the second shaft, the travelling magnet travelling between the first and second magnets, the magnets arranged such that the travelling magnet is repelled between the first and second magnets and wherein the second shaft bypasses one of the first and second magnets to reach the travelling magnet between the first and second magnets, wherein: the longitudinal axis of the channel is substantially aligned with a longitudinal axis of at least the first handle shaft, the second shaft is pivotally coupled to the interface and to the travelling magnet.

2. The vibrational decoupling interface as claimed in claim 1, wherein opposite sides of the travelling magnet are of the same polarity as that of adjacent sides of the first and second magnets.

3. The vibrational decoupling interface as claimed in claim 2, wherein the travelling magnet comprises a back to back pair of oppositely orientated magnets.

4. The vibrational decoupling interface as claimed in claim 3, further comprising a magnetic field between the pair of oppositely orientated magnets.

5. The vibrational decoupling interface as claimed in claim 1, wherein the first and second magnets are arranged such that respective magnetic forces thereof acting on the travelling magnet exceed a force threshold at a centrepoint therebetween.

6. The vibrational decoupling interface as claimed in claim 1, wherein the second shaft inserts into the channel and is pivotally coupled to the travelling magnet at a pivot point at the travelling magnet.

7. The vibrational decoupling interface as claimed in claim 1, wherein the interface comprises an aligned extension shaft running along the channel towards the other second shaft, the aligned extension shaft connected to the travelling magnet at a proximal end of the aligned extension shaft, the aligned extension shaft pivotally connected to the second shaft at a distal end of the aligned extension shaft and wherein the second shaft is restrained through an aperture of at least one of the second magnet and a collar between the proximal and distal ends of the aligned extension shaft.

8. A vibrational decoupling interface connecting between first and second handle shafts, the interface comprising a housing coupled to the first shaft, the housing defining a channel, the channel comprising a first magnet at a first end thereof and a second magnet at a second end thereof, the channel further comprising a travelling magnet coupled to the second shaft, the travelling magnet travelling between the first and second magnets, the magnets arranged such that the travelling magnet is repelled between the first and second magnets and wherein the second shaft bypasses one of the first and second magnets to reach the travelling magnet between the first and second magnets;
a biasing mechanism further acting on the travelling magnet, wherein the biasing mechanism assists between the first magnet and the travelling magnet and comprises a compression spring; and
wherein the first magnet is fixed at the first end of the channel and wherein the compression spring acts between the first magnet and the travelling magnet.

9. The vibrational decoupling interface as claimed in claim 8, wherein the biasing mechanism assists between the travelling magnet and the second magnet.

10. The vibrational decoupling interface as claimed in claim 8, wherein the first magnet travels along the channel and wherein the compression spring presses against the first magnet.

11. A vibrational decoupling interface connecting between first and second handle shafts, the interface comprising a housing coupled to the first shaft, the housing defining a channel, the channel comprising a first magnet at a first end thereof and a second magnet at a second end thereof, the channel further comprising a travelling magnet coupled to the second shaft, the travelling magnet travelling between the first and second magnets, the magnets arranged such that the travelling magnet is repelled between the first and second magnets and wherein the second shaft bypasses one of the first and second magnets to reach the travelling magnet between the first and second magnets, wherein the longitudinal axis of the channel is substantially orthogonal with a longitudinal axis of at least one of the handle shafts, the interface comprises a first end and a second end, each defining an aperture for a respective shaft orthogonally therethrough and wherein the first end and second end move with respect to each other, and each of the first and second ends comprise pieces which clamp together and which form the respective aperture therebetween.

12. The vibrational decoupling interface as claimed in claim 11, wherein the second end defines first and second adjacent channels having respective first and second magnets therein and wherein the first end defines a stem having laterally extending engagements which extend adjacently into the adjacent channels to hold respective travelling magnets therein.

* * * * *